Feb. 16, 1965   A. G. BODINE, JR   3,169,589
SONIC METHOD AND APPARATUS FOR EXTRUDING FLOWABLE MATERIALS
Filed Aug. 21, 1958   5 Sheets-Sheet 1
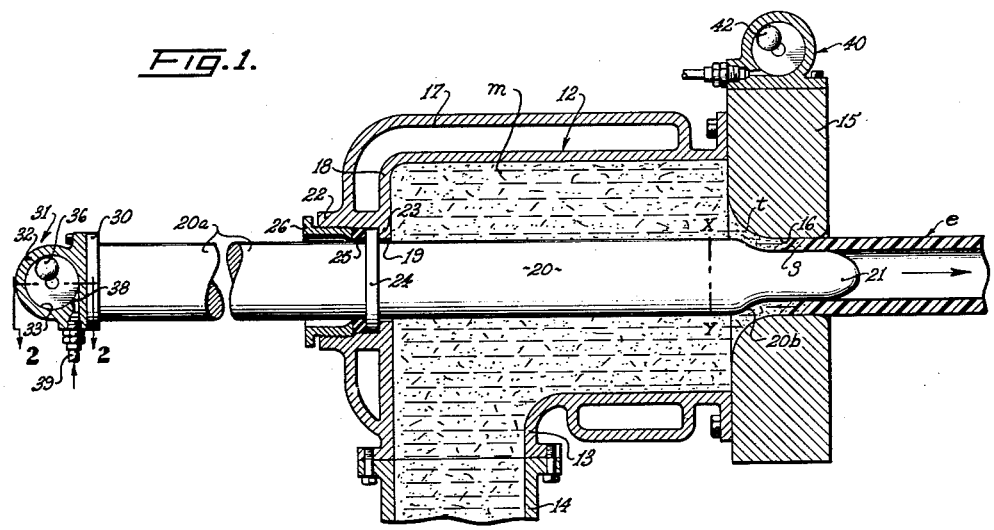
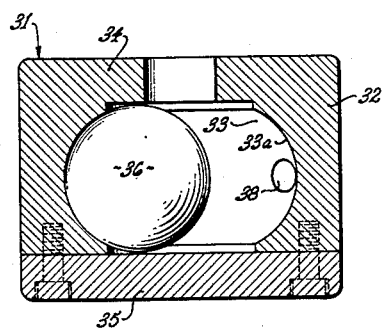
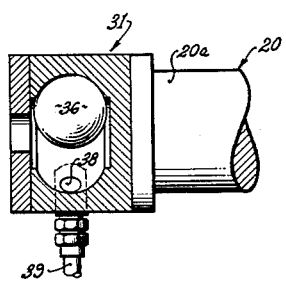
ALBERT G. BODINE JR,
INVENTOR.
BY
ATTORNEY

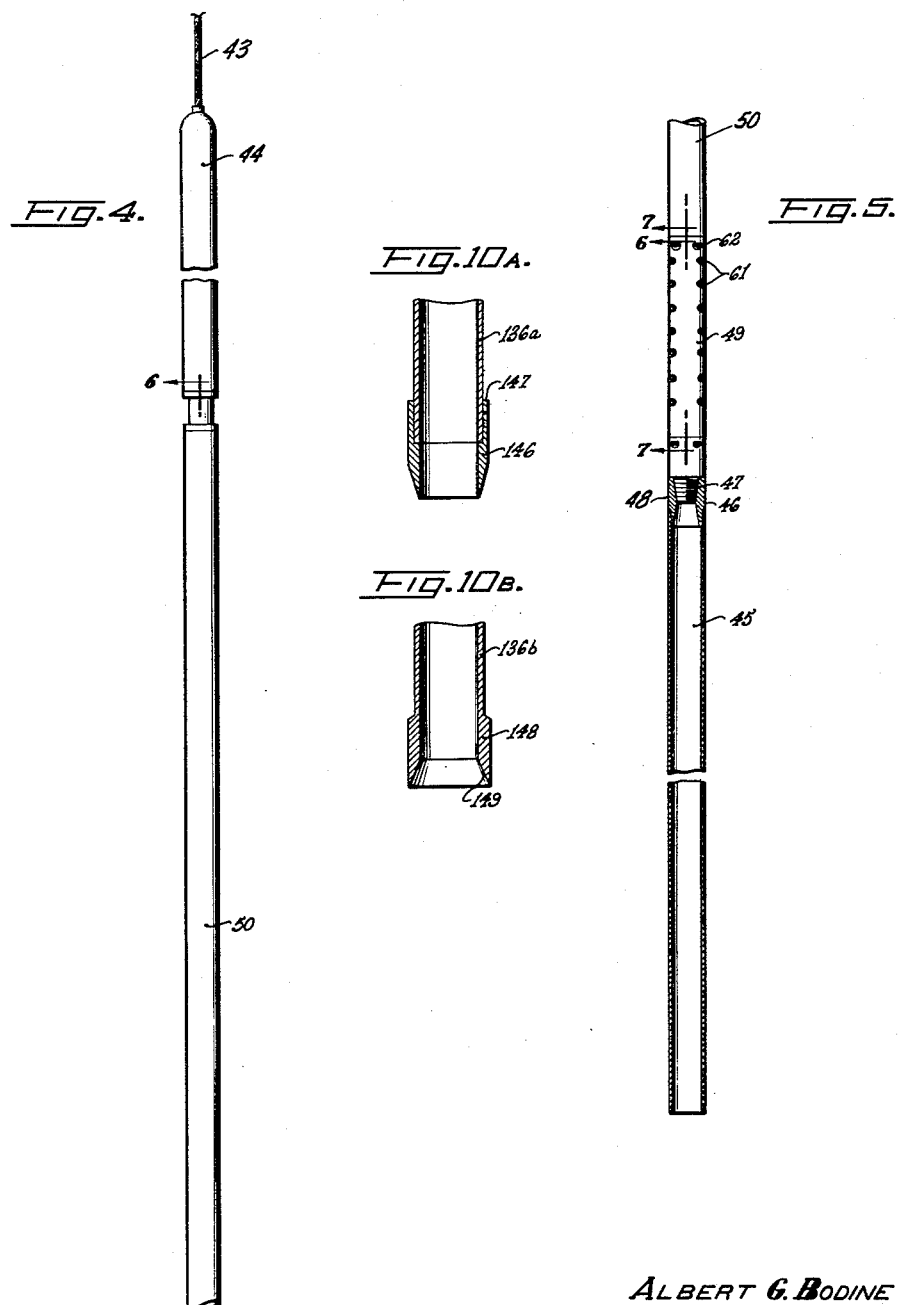

INVENTOR.
ALBERT G. BODINE
BY
ATTORNEY

Feb. 16, 1965 A. G. BODINE, JR 3,169,589
SONIC METHOD AND APPARATUS FOR EXTRUDING FLOWABLE MATERIALS
Filed Aug. 21, 1958 5 Sheets-Sheet 4

ALBERT G. BODINE
INVENTOR.

BY
ATTORNEY

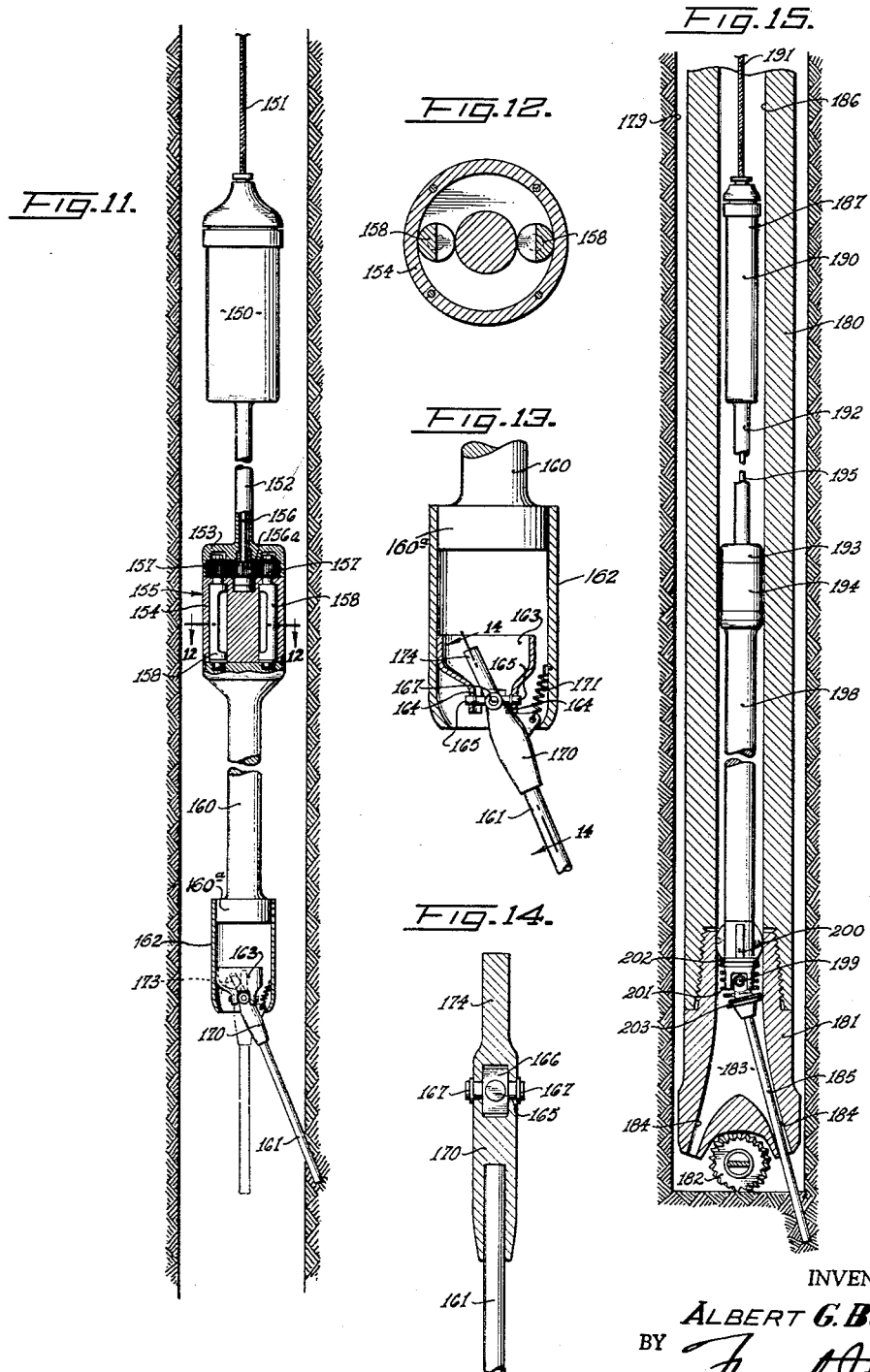

3,169,589
SONIC METHOD AND APPARATUS FOR
EXTRUDING FLOWABLE MATERIALS
Albert G. Bodine, Jr., Sherman Oaks, Calif.
(7877 Woodley Ave., Van Nuys, Calif.)
Filed Aug. 21, 1958, Ser. No. 756,382
11 Claims. (Cl. 175—58)

This invention relates generally to methods and apparatus for extruding flowable materials, and deals more particularly with the application of sonic wave action in such extrusion methods and apparatus.

The materials in contemplation include those in solid, semi-solid, or consolidated granular state, including plastic or semi-plastic materials such as rubber, plastics, metals and melts, and including also certain types of granular materials, such as sand, consolidated under earth pressure, or earthen materials generally, which while under static pressure can be caused to flow and extrude. The invention does not contemplate free or loose granular material, such as is often caused to flow down an open chute under influence of vibration.

The general object and nature of the invention may be stated preliminarily to be the facilitation of flow and/or extrusion of such materials as referred to above by application of sound waves either to the materials, or to the extrusion die orifice, or both; so as to transmit said waves to the boundary interface.

I have discovered that solid or semi-solid plastic or flowable consolidated materials can be made to extrude, i.e., pass through an orifice or tube, with enhanced facility if sound waves are transmitted to the point of start of flow and to the region therearound. In the extrusion of many plastic or flowable materials, certain complex physical phenomena are encountered, of the nature of static friction or cohesion tending to resist plastic deformation or flow. Moreover, the defining surfaces of the extrusion orifice also appear to contribute a degree of static friction to the extruded material moving thereover.

Sound waves applied to the extrusion nozzle or orifice and/or to the materials to be extruded therethrough tend to increase the fluidity of the material. Apparently the sound waves produce a dynamic fluidity, due to the sonic vibration of the material, and to vibratory shear stresses set up therein.

A conventional extrusion apparatus consists generally of a chamber for containing material to be extruded, a pressure source which applies a high static pressure to the material in said chamber, and a nozzle, orifice or die opening leading from the chamber and through which the material is extruded, such nozzle, orifice or die opening being usually shaped to accomplish a particular cross-sectional configuration. The present invention, broadly stated, comprises the application of intense sound waves to the material in the region of the nozzle, orifice or die opening, including the material in the region of the entrance thereto, and/or to the nozzle or orifice itself and particularly to the interface between the nozzle, tube or orifice and the material, the result being great facilitation of the extrusion process. The material flows with lower pressure, or at lower temperature; it flows uniformly throughout its cross section, rather than being retarded adjacent the nozzle surfaces; and much more intricate shapes can be extruded, even those having an unusually large ratio of surface area to cross sectional area, such as radially-extended thin fins, etc. In complex extrusion processes, where odd-shaped or thin cross sections are involved, the material sliding along the surface of the nozzle or die is retarded owing to friction on those surfaces, so that the central portion or core of the extruded material tends to roll over the outer region or shell. As mentioned hereinabove, this condition is greatly reduced by transmitting sound waves into the region which includes the area of surface contact between the material and its guiding nozzle or die.

The exact same phenomena involved in the foregoing application of the invention to the extrusion of a flowable material from within a chamber through a reduced extrusion orifice occurs also in another broad application of the invention wherein samples of earth material, from either the side or bottom wall of an earth bore, for example, are sonically induced to flow into a core barrel pressed against the earth material. In this case, the earth mass from which the core or sample is to be taken corresponds to the material within the chamber of the extrusion apparatus, the core barrel corresponds to the extrusion orifice leading from such chamber, and pressure of the end of the core barrel against the body of earth material takes the place of pressure on the material within the chamber of the extrusion apparatus. Sonic wave action in the core barrel and in the immediately adjacent earth material facilitates entry of the earth material into the barrel, and its passage therealong, just as in the case of the extrusion process first mentioned. A typical form of apparatus in accordance with the invention includes an elongated thin-walled tube or barrel, which is caused to vibrate sonically. The sonic vibration can be one of various vibration modes, such as the longitudinal mode, wherein the tube is made to alternately elastically elongate and contract in a lengthwise direction, the torsional mode, wherein the tube oscillates in a torsional or rotary manner, or a gyratory mode, wherein lateral waves in quadrature are transmitted down the tube, causing a gyratory type of action. Simple lateral modes and other vibration patterns can also be employed.

For simplicity of explanation, there will first be discussed a typical form of the invention which includes a longitudinally vibratory tube driven by a sound wave generator. This tube is made to alternately elastically elongate and contract by waves of elastic deformation transmitted therealong at the speed of sound and at a sonic wave frequency. A typical configuration comprises a tube with a sound wave generator coupled to the top end thereof. Sound waves transmitted from the generator into the tube are propagated along the tube to the lower end thereof, causing the lower end edge to function as a sound wave radiator. When the vibrating lower end of this tube is pressed against the earthen material, so as to accomplish an acoustic coupling thereto, sound waves are radiated into the material through an annular area of the material under the lower tubing edge, sonically activating and fluidizing the material in that localized region, and causing a core of the material to be received within the tube, which thus functions in a manner equivalent to that of an extrusion orifice. This process seems to attain maximum activity especially after some material has been received inside of the tube. It does not appear at all necessary that sound waves be transmitted any appreciable distance into the earth below the edge of the tube, the function of the sound waves being concentrated in the material right at the point where the extrusion flow commences and continues on into the tube. The sonic activation apparently fluidizes the material immediately under the edge of the tubing, thereby enhancing flowability of the core relative to the tube whereby its "extrusion" into the tube is facilitated.

A further unique aspect of the phenomena involved in my invention is a transmission of the sonic waves in the tube into the inside core by virtue of shear coupling between the inside wall of the tube and the core. This effect facilitates the relative flow of the core with respect to the tube, so that there is a minimum of back resistance on the core-taking process, which is simultaneously progressing at the bottom edge of the tube. The net result is that with my process, very long continuous cores can be taken.

The core-taking process of the present invention is to be contrasted with a sonic earth bore drilling process, wherein sonic vibrations of a drill bit act to chip and fragment the earthen material, sometimes for some distance ahead of the bit. This drilling process has been determined to proceed essentially by virtue of an elastic fatigue of the rock some distance below the bit. Such action in sonic drilling has been verified by running a bailing tool into the well and discovering that broken rock can be bailed out for some distance ahead of the bit. With my sonic extrusion process, on the other hand, there is apparently no chip making effect either close to or for any substantial distance below the lower end of the sample tube, the action being more one of fluidizing the material immediately adjacent the lower end of the tube whereby its reception into the tube is facilitated.

It has been noted by other researchers that earthen materials, particularly when under high static pressure, exhibit a plastic property which causes these materials to become fluidized or flowable. This characteristic is currently a point of great interest to those concerned with drill bit design and operation, because it evidently explains the limited performance of conventional rotary rock bits at substantial depth. In a drilling process, of course, flow of the material against which the bit is operating for the purpose of taking chips is highly detrimental. This is especially true of any type of drilling process wherein successive chipping impacts are delivered. Flowability of material is accordingly a detriment in drilling, particularly with impacting types of bit.

On the other hand, this plastic or flowable property of earthen material at substantial depths, and under static pressure, is an advantage rather than a disadvantage in the core-taking process of the present invention. The material is thus, in at least many cases, in a somewhat flowable state at the outset. Sonic activation of this material, originating at the perimeter of the core to be taken, then sets the adjacent flowable material into vibration, with a further substantial fluidizing effect, and causes the core to be readily separated from the surrounding material, and to be received readily within the sample tube.

Usually, my sonic core-taker is used for taking informative samples from reasonable short selected intervals during the normal well drilling process. However, a long core may also be taken, starting at the ground surface and continuing deep into the earth, or cores may be taken as desired over relatively long intervals of questioned formation, interspersed by intervals during which ordinary drilling is pursued. As will appear hereinafter, my core tube can be quite long, permitting the taking of unusually long samples.

The invention will be further described in connection with the accompanying drawings showing various present illustrative embodiments thereof, and wherein:

FIG. 1 is a longitudinal sectional view through an extrusion apparatus in accordance with the invention;

FIG. 2 is a section taken on line 2—2 of FIG. 1;

FIG. 3 shows a modified orientation of vibration generator for the apparatus of FIG. 1;

Figure 6:
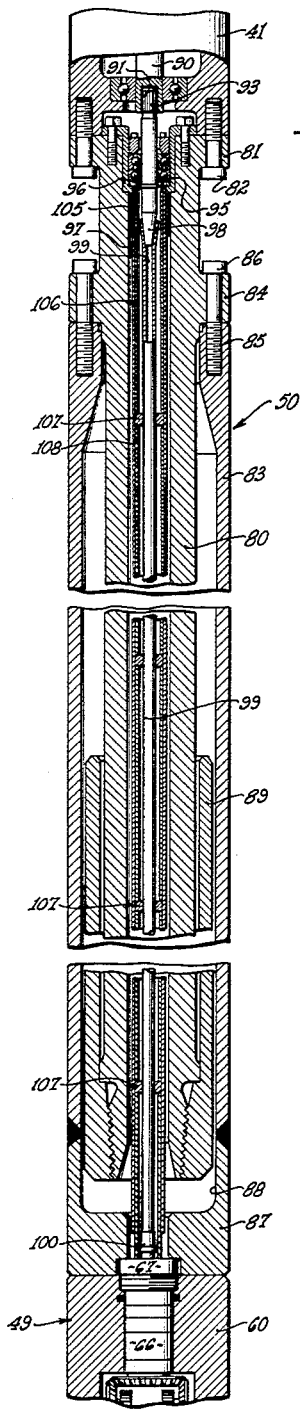
Figure 7:
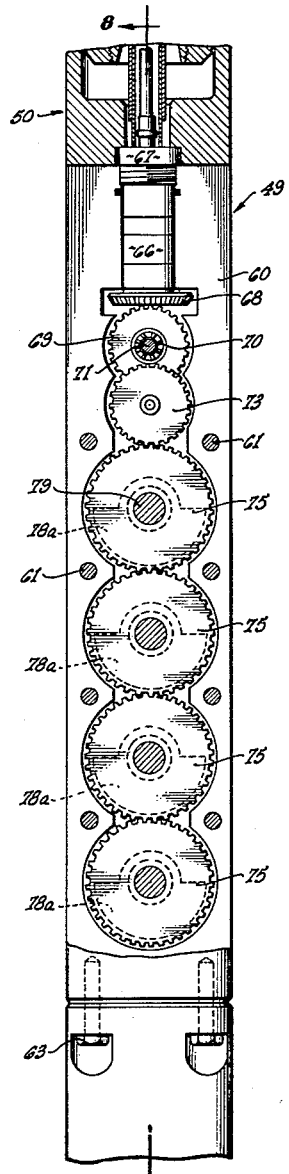
Figure 8:
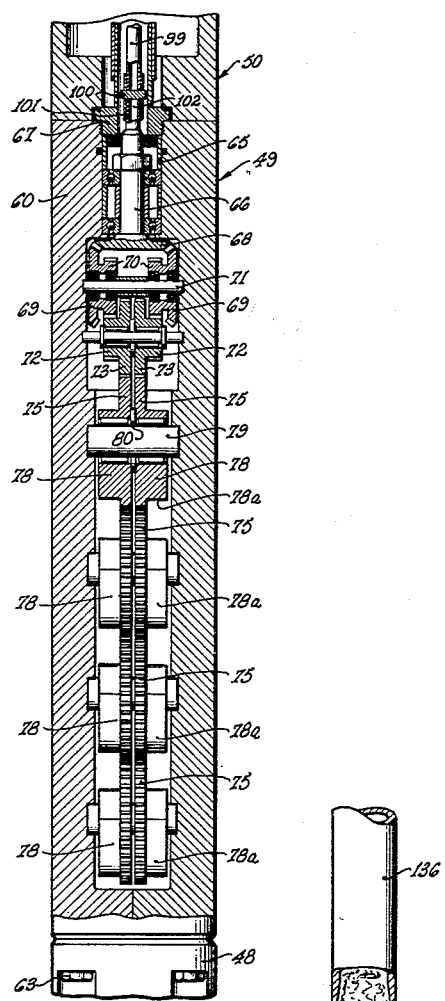
Figure 10:
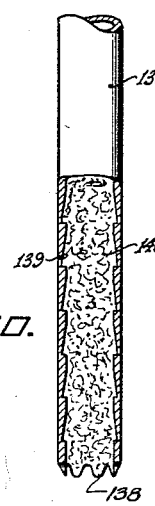
Figure 9:
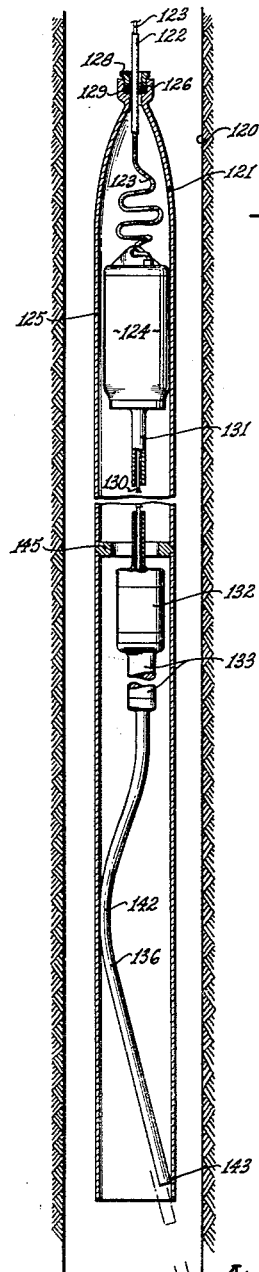

FIGS. 4 and 5, taken together, show, partly in elevation and partly in longitudinal section, a form of the invention adapted for taking cores of earth material within an earth bore;

FIG. 6 is a longitudinal section taken in accordance with section line 6—6 of FIGS. 4 and 5;

FIG. 7 is a section taken on line 7—7 of FIG. 5;

FIG. 8 is a section taken on line 8—8 of FIG. 7;

FIG. 9 is a view partly in elevation and partly in longitudinal section, showing another embodiment of tool for taking a sample of material from within an earth bore, the apparatus in this case being designed particularly for sidewall sampling;

FIG. 10 is a detail, partly in elevation and partly in section, showing the lower extremity of the sample taking tube of the apparatus in FIG. 9;

FIG. 10A shows a modified tip for the sample taking tube;

FIG. 10B shows another modified tip for the sample taking tube;

FIG. 11 shows a modification of FIG. 9;

FIG. 12 is a section taken on line 12—12 of FIG. 11;

FIG. 13 is an enlarged detail of portion of FIG. 11, further sectionalized;

FIG. 14 is a section taken on line 14—14 of FIG. 13; and

FIG. 15 is a view partly in elevation and partly in longitudinal section showing another modification of the apparatus of FIG. 9.

The invention will first be disclosed in a simple illustrative application to the extrusion of thermoplastic materials, reference being had to FIGS. 1 and 2 showing simple illustrative extrusion apparatus equipped with means for applying sonic wave action both to the material being extruded and to the extrusion die members. A generally cylindrical material chamber 12 has an inlet 13 supplied with pressurized heated plastic material $m$ in a flowable state via a conduit 14, and has fastened to one end thereof a vibratory die plate or disc 15 formed with a central orifice 16 through which the material is to be extruded. Chamber 12 is here shown as formed with a heat jacket 17 for purpose of maintaining the material within the chamber 12 in a proper state of plasticity for good extrusion. The end of cylindrical chamber 12 opposite the guide plate 15 has an end wall 18 formed, in axial alignment with extrusion orifice 16, with an aperture 19 to receive an elastic bar or mandrel 20, typically of circular cross-section. Mandrel 20, in the present instance, includes a reduced extremity 21 projecting with annular clearance through the orifice 16, the extremity 21 being connected to the main portion of the mandrel on a streamlined contour as clearly shown in FIG. 1. Mandrel 20 projects through wall 18 by way of a sleeve 22 extending outwardly from wall 18 on a diameter somewhat larger than that of aperture 19, as shown. The annular shoulder 23 formed by this construction is engaged by one side of an annular flange 24 formed about the mid-portion of mandrel 20, and the other side of this flange is engaged by a resilient washer 25, which is in turn backed up by a nut 26 screwed into sleeve 22.

The extremity of rod portion $20a$, outward of flange 24, has a mounting flange 30, to which is secured a vibration generator generally designated by the numeral 31. The generator 31 may be any one of various types, and may be designated to produce any one of various modes of vibration, such as longitudinally of the rod, transverse, or gyratory, as will be explained in more particular hereinafter.

The contour of the die orifice 16 and of mandrel portion 21 are subject to variation in design in accordance with the desired cross-section of the extrusion to be produced. In the present illustration, it is assumed that a simple cylindrical tubing $e$ is to be extruded, in which case, the orifice 16 is circular in cross-section, as is the mandrel portion 21. It will be understood, of course, that these shapes may be varied as desired, and that, because of the facilitation of the extrusion process by the application of sonic wave action, cross-sectional shapes impossible to produce with previously known techniques, such for example as thin fins, are well within the capabilities of the present process and apparatus. The die orifice 16 and mandrel portion 21 are longitudinally contoured, in accordance with more or less conventional practice, to provide a streamlined, convergent entrance throat $t$ leading into the constricted region where the final shaping is imparted to the material. Further, while I have here shown apparatus for extruding a tubular shape, it will be understood that in any case in which a solid shape is to be extruded, the mandrel 20 will be terminated short of the die orifice such as at $x$–$y$. In such case, the bar serves only as a sound wave radiating device, its function as an inner die member having been removed.

While various types of vibration generator might be employed, including electrically driven types, such as magneto-striction generators, I prefer to employ a simple mechanical type utilizing a spinning rotor driven by an air jet. In this case, the generator 31 comprises a housing 32 formed with a circular chamber 33 closed on one side by an integral wall 34 and on the other by a removable cover plate 35. In the cavity 33 is a steel ball 36, of substantially lesser diameter than the major diameter of the cavity 33, and adapted to be rolled around the inner peripheral rolling bearing surface 33a of the chamber as a raceway by fluid injected tangentially into the chamber 33 via nozzle 38, to which is coupled air supply hose 39. The tangentially-introduced air spins the ball 36 about its raceway 33a, and the spinning ball accordingly exerts a centrifugal force on the housing 32, and in turn, on the end disc 30 of the elastically vibratory mandrel 20.

It will be seen that a component of oscillating force is thus delivered to the end of mandrel 20 in a direction laterally of the latter, and that also a component of oscillatory force is exerted on the end of the bar in a direction longitudinally of the mandrel.

The mandrel 20 is supported effectively near its midpoint through its mounting flange 24 and is arranged to undergo free-free standing wave vibration, and this vibration may be either predominantly in the longitudinal mode or predominantly in the transverse mode, depending upon whether the oscillating force delivered by the generator 31 is near a resonant frequency of the mandrel for longitudinal vibration or is near a resonant frequency of the mandrel for transverse vibration. Generally speaking, particularly with inner and outer die members, as here shown, for purpose of extruding a tubular member, it is deemed preferable to choose the longitudinal mode of vibration, and such will be assumed for the purpose of the present illustration, though of course without implied limitation thereto. In such case, the ball 36 is driven with such spin frequency, regulated, of course, by the amount of pressure behind the injected air stream, as to correspond to a longitudinal resonant vibration frequency of the bar. Thus, the mandrel may be vibrated in a half-wavelength mode by proper choice of spin frequency, such that its supported midpoint becomes the location of a node, and its two end portions are the locations of antinodes of the standing wave. Under such circumstances, each half-portion of the mandrel alternately elastically elongates and contracts, the two half-portions of course undergoing this action in step with one another. The sides of the mandrel 20 have a degree of shear coupling with the surrounding plastic material, and therefore subject the material to sound wave vibration. The slanting shoulder 20b between the central portion of the bar and the reduced extremity 21 has a longitudinal sonic drive coupling with the material within the throat region $t$ and constricted die annulus $s$, and thus applies sonic wave action to the material flowing into and through the die annulus.

Moreover, not only is the plastic material subjected to sound wave action ahead of and within the die annulus, but the inner die member 21 also vibrates (in a longitudinal direction) with respect to the plastic material being extruded over its outer surface. This sound wave action increases the fluidity of the material. A dynamic fluidity is produced, owing to the sonic vibration of the material and to vibratory shear stresses set up therein. The sonic vibration so imparted to the material flowing through the die annulus and also the longitudinal vibration of the inner die member 21 reduce the friction between the extruding material and the inner die member, so that the material tends to flow uniformly, without retardation by reason of sliding friction with the member 21.

The invention further provides for imparting sonic vibration to the outer die member of plate 15, and to this end, a second vibration generator 40 like the generator 31, or a plurality of such generators, may be mounted to the outer die member 15, in this case, on its edge, as shown. By choice of spin frequencies for the ball 42 of generator 41 various resonant modes of vibration may be imparted to the member 15. One preferred mode is a flexural plate-type mode, characterized by an in-and-out elastic "bowing" of the disc 15. Vibration occurs transverse to the plane of the disc. The outer or rim portion of the disc oscillates elastically at right angles to the plane of the disc, the inner portion of the disc likewise oscillates elastically in a direction at right angles to the plane of the disc, but at opposite phase, and an annular nodal region of minimized oscillation occurs between the rim and inner portions of the disc. The plate 15 can be proportioned to place this node in alignment with the wall 12. This mode of vibration occurs at a certain predetermined resonant vibration frequency, and by supplying air to generator 41 at the proper pressure, the ball 42 is spun at a frequency approximating this resonant frequency, and the described mode of vibration is attained. It will be seen that in this mode of operation, the die surfaces defining the orifice 16 vibrate in a direction substantially parallel to the extrusion, so that retardation of flow along such surfaces is reduced. In result, the material being extruded moves uniformly throughout its cross-section without retardation and consequent rolling action over the surfaces of the die members.

As mentioned earlier, the material being extruded flows with lower pressure, and/or at lower temperature, flows uniformly throughout its cross-section, and flows with such enhanced facility that more complex cross-sectional configurations can be employed, including thin longitudinal fins and other complex shapes of large surface.

FIG. 3 shows a modification, wherein the generator 31 is so mounted on the end of the mandrel 20 that the orbit of the ball 36 is in a plane transverse to the bar. In this case, the centrifugal force exerted by the ball 36 acts to gyrate the end portion of the mandrel 20. In effect, the end portion of the mandrel is subjected to a rotating force vector which extends radially through the longitudinal axis of the mandrel. The effect is to cause the mandrel to be progressively elastically bent in a circular path, each point on the end portion of the mandrel describing a small circle. This bending action is propagated as a wave transmitted along the length of the mandrel, reflected back from the far end thereof, re-reflected at the beginning end, etc. A resonant frequency exists for this mode of wave action in the bar, and when the spin frequency of the rotor is adjusted thereto, a standing wave is again established in the bar, with a nodal point at its midpoint, and antinodes at its two ends. Accordingly, with this mode of vibration, the bar portion 22 forming the inner or male member of the die gyrates in a plane transverse to longitudinal axis of the extrusion, applying corresponding sonic wave action thereto, and resulting in enhanced fluidity, or flowability, through the die.

An illustrative application of the invention to the taking of cores from earth bores will next be described, reference being had to FIGS. 4–8.

FIGS. 4 and 5 taken together show a string of components adapted to be lowered in a bore in the earth on any suitable lowering means such as commonly used in oil well operations, but which is here shown illustratively as a flexible cable 43, which is to be understood as including a central electrical conductor for supplying electric power to an electric drive motor unit 44. This motor unit 44 may be any suitable submersible electric motor, the details of which need not herein be set forth.

At the lower end of the string of components shown in FIGS. 4 and 5 is a long, thin-walled extrusion tube or barrel 45 typically of 1/8" wall thickness, 5" O.D., and 60' in length. This tube 45 has at the top an internally-threaded coupling box 46, into which is screwed the correspondingly-threaded coupling pin 47 on the lower end of a sub 48, which is in turn coupled to the lower end of sonic wave generator or oscillator unit 49. The generator unit 49 may be designed to produce longitudinal, torsional, or transverse modes of vibration, such as by selecting the desired phasing of plural vibrating weights in the generator, and transmit these modes to and along the core tube 45. I have here chosen to illustrate a case wherein the longitudinal mode of sound wave action is employed, and the details of an illustrative sound wave generator or oscillator of this type will be presently described.

The upper end of generator 49 is attached to the lower end of a resonant oscillatory energy storage device 50, the upper end of which is in turn secured to and suspended from the lower end of the submersible motor 44. Without going into detailed explanation at this point in the specification, the purpose of the device 50 is to provide the apparatus with a resonant acoustic "circuit" of high "Q," by which the vibratory apparatus is stabilized and operates at high efficiency and effectiveness. The factor "Q" will be understood to be a figure of merit in oscillatory systems, denoting the ratio of energy stored in the system to energy expended per half-cycle of operation. The "Q" factor is somewhat akin to flywheel effect, and assures stabilized, powerful operation. Such a device avoids wastage of force owing to vibratory masses in the vibration generator, and brings the full potential power of the generator to bear on the work to be done. It will be described in more particular hereinafter.

In the particular configuration of apparatus in the embodiment under consideration, the vibration generator 49 is driven from the submersible motor 44 through a long shaft running through the oscillatory device 50, as presently described in more particular. The generator 49 has an operating frequency in the range of the resonant frequency of the device 50, and thus sets the latter into resonant vibration. The generator 49 thereby vibrates at substantial amplitude, and this vibration is transmitted to the core-taking tube 45.

An example of a suitable vibration generator 49 is shown in FIGS. 7 and 8 and will next be described in detail.

The vibration generator 49 has a hollow housing 60, which is longitudinally split into two halves, and bolted together as at 61. At the upper end, it is connected to the lower end of unit 50, as by high strength screw fastening means indicated at 62 in FIG. 5. At the lower end, the housing is secured to the upper end of sub 47, as by screw means indicated at 63 in FIG. 8.

The generator housing 60 is closed at the bottom, as shown, and formed with an interior cavity conforming to and accommodating certain rotating parts and bearings as now to be described. Extending downwardly into housing 60 from its upper end is a bore 65 which receives certain bearings for vibrator drive shaft 66, the bearings being spaced by spacer sleeves, as indicated, and being retained by a threaded retainer 67, screwed into the upper end of bore 65. The head of retainer 67 is recessed into the lower end of unit 50, as shown. On the lower end of drive shaft 66 is a bevel bear 68 meshing with two bevel gears 69 integral with two spur gears 70 and mounted for rotation in opposite directions on suitable bearings on a shaft 71 set into the vibrator housing. The gears 70 mesh with spur gears 72 integral with larger spur gears 73 set into the vibrator housing below shaft 71. The two gears 73 mesh with spur gears 75 on the peripheries of two unbalanced vibrator rotors 78 mounted side by side, for rotation in opposite directions, on a common shaft 79 set into the housing. The two rotors are spaced by means of a hardened steel washer 80, as indicated. There are four such pairs of rotors 78, ar-ranged vertically one above the other, with the gears 75 thereof in mesh from rotor to rotor. Lubrication of these parts is accomplished by introducing a few cubic centimeters of oil to the interior of the vibrator housing.

The eccentric weights 78a of all rotors of the vibrator are arranged to move vertically in unison. It will be seen that the two rotors of each pair turn in opposite directions, so that lateral components of vibration are counterbalanced. Vertical components of vibration of all rotors, however, are in phase and therefore additive. The rotors 78a, thus moving vertically in unison, deliver through their mounting shafts 79 and to the vibrator housing 49 a vertically-directed alternating force of substantial magnitude. This alternating force is exerted on the lower end portion of the unit 50 immediately above, with the result that a longitudinal mode of resonant oscillation is generated in unit 50.

Turning attention now to the oscillatory device 50, and with reference more particularly to FIG. 6, the device comprises essentially an axially-bored cylindrical rod or bar 80, composed of a good elastic material, such as steel, formed at the top with a mounting flange 81 by which it is secured, through screws 82, to the lower end of the housing of motor 44, and a surrounding cylindrical housing member 83, composed of similar elastic material, connected at its upper end to the upper end portion of rod 80. For example, the upper end portion of the rod 80 may be formed with an annular flange or shoulder 84, which is abutted by a somewhat thickened upper end portion 85 of the housing 83, with the parts connected by means of machine screws 86, extending down through flange 84 and threaded into housing portion 85. A rigid, structurally-integrated connection is thus made between the upper end portions of the members 80 and 83. The housing member 83 has a lower end closure wall 87, recessed as hereinabove mentioned to receive retainer 67, and formed with an axial bore 88 to receive a presently-described drive shaft and shaft housing.

The device 50 is of considerable length, illustratively, approximately 26 feet from its lower end to flange 84 near the top. The cross-sectional areas of hollow rod 80 and the surrounding cylindrical housing 83 are preferably made approximately equal. The members 80 and 83 are annularly spaced, as shown, and preferably, there is screw-coupled to the lower end of member 80 a mass loading sleeve 89, typically 3 feet in length, received in the annular space between members 80 and 83, with adequate clearance being provided between sleeve 89 and the housing 83. The purpose of this sleeve 89 can best be described later.

The oscillatory device 50 will be seen to be similar in certain respects to a tuning fork, the inner and outer members 80 and 83 constituting the legs thereof, and these legs being firmly joined at the top to form a common head structure. However, whereas the legs of the simple tuning fork bend transversely in their vibratory action, the legs of the present device alternately elastically elongate and contract in the longitudinal direction, these actions being of opposite phase in the two legs, so that dynamic balance is preserved. The head structure, where the two leg elements are joined, remains substantially stationary in this action, being at the node of a quarter-wave standing wave in the device. The effective lower ends of the two legs are the locations of antinodes of the standing wave. This vibratory action is obtained when the structure is excited at a vibration frequency for which the structure is resonant; and a tuned resonant structure is attained when the two legs 80 and 83, taking into account mass loading by both the generator and the sleeve 89, both are of an effective length substantially a quarter-wavelength for the exciting frequency. As will be readily appreciated by those skilled in the acoustics art, the structure may be "tuned" in various ways, as by modifying the cross-sectional area of one or both of the legs, or by adding so-called "lumped" mass to one of the legs, e.g., the sleeve 89. It will be observed that the outside leg is longer than the inside leg 80, and also has certain lumped mass at its lower extremity, both by reason of the end wall 87, and by reason of the coupled-in mass from the generator 49. The outside leg accordingly tends to have substantially greater effective length in terms of quarter-wavelength distance than inside leg 80 when the latter is considered without the added sleeve 89. To tune the inner member 80 to the outer member 83, the sleeve 89 has been added to the lower end of the member 50, thereby adding substantial mass, and correspondingly lengthening the leg in terms of quarter-wavelength distance. By this means, two legs 80 and 83 are tuned to the same resonant vibration frequency. This subject will be dealt with at greater length hereinafter.

The electric drive motor 44 and its internal details may be conventional and hence require no illustration herein. This motor has a vertical drive shaft 90 (see FIG. 6) whose lower end is formed with a splined socket 91, and an extension shaft 92 has a splined head 93 meshing with the splines in socket 91, and is supported in bearings contained within a bearing retainer 95 set into a bore 96 formed in the upper end portion of member 80. Extending downwardly through member 80 along the longitudinal axis thereof, below the bore 96, is a slightly reduced bore 97. Shaft 92 has at its lower end a taper friction joint coupling 98 to the upper end of a tubular drive shaft 99 which extends downwardly through bore 97 and has at its lower end a driving coupling with the upper end of the drive shaft 66 for vibration generator 49 (see FIG. 8). As shown, there is fitted onto the lower end of tubular drive shaft 99 a coupling 100, which is formed at the bottom with an internally splined socket 101 receiving the reduced splined upper end portion 102 of drive shaft 66. In operation, as will subsequently appear, the housing of generator 49, and therefore also the drive shaft 66 for the generator, oscillate vertically through a certain displacement distance, and the splined connection between oscillator drive shaft 66 and the tubular drive shaft 99 accommodates this relative motion.

Bearing retainer 95 (FIG. 6) includes a reduced portion 105 projecting a short distance down into bore 97, and connected thereto and extending throughout the length of member 80 is a shaft housing tube 106. Bearings 107 in this housing tube 106 serve to journal the tubular drive shaft 99, and are spaced by spacer sleeves 108. Clearance is provided between housing tube 106 and the inner wall surface of the bore 97 in rod 80 in order to guard against rubbing contact therebetween during vibratory action of member 80.

The core barrel or tube 45 has a length related to the effective lengths of the legs 80 and 83 of the oscillatory device 50, and in this case, may be approximately 60 feet in length, which is a half-wavelength distance for an operating frequency of about 133 c.p.s. In the present design, the length of member 50, from the lower end of housing 83 to flange 84, may be 26.6 feet. Taking into account the previously-described lumped masses effectively added to both inner leg 80 and outer leg 83, the effective length of each leg, in terms of wavelengths, is one quarter-wavelength for the predetermined operating frequency of 133 c.p.s. In other words, the effective length of device 50 is half the length of the core tube 45. With the system operating at an operating frequency of approximately 133 c.p.s. the housing of vibration generator 48 oscillates vertically through a material displacement distance at that operating frequency, and sends corresponding elastic deformation waves down to the core tube 45. In view of the fact that the core tube is a half-wavelength for the operating frequency, a half-wavelength standing wave is set up in the core tube, with a velocity antinode at the top, a velocity antinode at the bottom, and a node at the midpoint. Thus the midpoint of the tube stands substantially stationary, vertically, having only a dilational vibration caused by the longitudinal mode, whereas the upper end portion oscillates vertically in correspondence with the oscillatory driving action of the generator housing, and the lower edge of the tube oscillates vertically against the earthen formation from which the core is to be extruded, radiating sound waves into the earth material immediately below the annular lower edge of the tube.

The overall operation of the system is as follows: Assuming, for example, that a bore has been drilled into the earth to a certain depth, and that a core is to be taken for a number of feet below that depth, the drilling apparatus is removed from the bore hole and the apparatus shown in FIGS. 4 and 5 lowered therein on suspension cable 43 until the lower end of the core tube 45 is in pressural engagement with the bottom end of the drill hole. Electric power is then conveyed via an electrical conductor in suspension cable 43 to drive motor 44, which drives shaft 99, extending downwardly through the oscillatory device 50, and in turn the drive shaft 66 for vibration generator 49. It is necessary, as mentioned earlier, that the operating frequency be a resonant frequency for the oscillatory device 50 and the core tube 45. A.C. electric power of the proper frequency for the correct drive of electric motor 44 may be obtained from a generator driven by a variable speed internal combustion engine.

Accordingly, generator 49 delivers an alternating force in a vertical direction at the predetermined resonant operating frequency of the system. This alternating force is exerted on the lower end of the outer tubular leg 83 of the oscillatory device 50, sending elastic deformation waves of alternating elongation and contraction up said leg. By virtue of force interactions occurring in the region of juncture of the outside tubular leg 83 with the inside cylindrical leg 80, corresponding longitudinal elastic deformation waves of like nature but of opposite phase occur in the latter. These waves in the members 80 and 83, being at the resonant frequency of the structure, the amplitude of the elastic deformations occurring therein becomes magnified, and a running condition is quickly attained at which the two legs 80 and 83 each undergo alternate longitudinal elastic elongations and contractions, of opposite phase with respect to one another. Dynamic balance longitudinally of the device is thereby gained. In such operation, the oscillatory device 50 functions as an energy reservoir of high "Q," stabilizing the entire system at high vibration amplitude. In this action, the two legs of the device alternately store and supply energy to the system, as will readily be appreciated by those skilled in the art.

Confining attention for a moment to the alternating vibration or force generator 49, it may be appreciated that the vertical oscillatory motion undergone by the housing and other mass components of the generator represents a potential serious wastage of the alternating force generated therein. An important function of the oscillatory device 50 is to "tune out" the oscillatory mass of the generator housing and thereby conserve this otherwise wasted force. This mass, being coupled directly to the lower end of the leg 83 of the oscillatory device 50, becomes in effect a lumped mass added to the lower end of that vibrating leg, as mentioned earlier. This mass thus becomes a part of the vibratory system 80, 83, and is balanced by the elastic compliance inherent in the members 80 and 83. The effect of the coupled-in mass of the generator is to lower the resonant frequency of the device 80, 83. The added mass also, when added to the outer leg 83, overweights the latter as compared with the inner leg 80, and to restore balance, the sleeve 89 connected to the lower end of the inner leg 80 is made of the necessary counterbalancing mass. Without such mass thus added to the inner leg 80, the addition of the mass of the generator 49 to the outside leg 83 results in the desired node at the upper end junction of legs 80 and 83 becoming shifted downward within the outside leg 83, so that the substantially stationary point of the vibratory system, i.e., the node, is located within the leg 83, some distance down from the upper end thereof, whereas the junction region is no longer at a node and undergoes some degree of vibration. The added mass 89 is thus made of such value as to preserve the location of the node in the junction region of the members 80 and 83.

Such conditions having been attained, the lower end of the vibration or force generator 49 oscillates vertically at substantial amplitude and exerts an alternating force of substantial magnitude on the upper end of the core tube 45. This force application to the core tube sets up a half-wavelength standing wave therein, as hereinbefor described, causing the lower edge of the core tube, which is being held under a certain degree of pressural engagement against the bottom of the earth bore, to oscillate against the earthen material.

As heretofore described, the action of the oscillating lower edge of the core tube against the earth is to locally increase the fluidity of the earthen material immediately adjacent thereto, causing a core of earth to be separated from the surrounding earth structure and to flow or extrude readily up inside the core tube as the core tube descends. It will be appreciated that the equipment is rested, at least partially, on the hole bottom, so that downward biasing pressure is exerted by the core tube on the earthen material and a sonic coupling between the core tube and earthen material thereby effected; and also that the equipment is gradually lowered as the core taking operation proceeds. The longitudinally vibrating core tube acts not only on the earth material immediately under its lower edge, but also by shear coupling on the core which has extruded up into the tube so as to sonically activate the surface portion of the core, thereby reducing friction between the core and the tubing and thus further facilitate movement of the core up the tube. It will be seen that back resistance of the core is thereby relieved or materially reduced, which again facilitates movement of the core into the tube at the point of entrance.

In FIGS. 9, 11 and 15 are illustrated three different embodiments of apparatus in accordance with the invention for extruding or taking a small diameter core or sample from the side wall of a drill hole in the earth, a torsional mode of vibration being illustratively employed in each instance.

Referring first to the embodiment of FIG. 9, numeral 120 designates a well bore previously drilled by any well drilling apparatus, and numeral 121 designates generally a sample-taking apparatus in accordance with the invention, the apparatus being here shown as suspended in the well bore by means of a flexible suspension cable 122, which has within it an electrical conductor 123 for conveying electrical power to an electrical drive motor 124. The motor 124 and other parts of the apparatus are housed within a tubular casing 125, the lower end of which is open and the upper end portion of which is convergent to a tubular fitting 126 which is bored to pass cable 122, and is counter-bored and internally screw-threaded to receive a clamping nut 128 formed with an internal conical surface adapted to engage wedge elements 129 and force the same into clamping engagement with the cable.

Motor 124 has its axis vertical, and is of any conventional type. This motor 124 drives a shaft 130 extending downwardly therefrom through a torque tube 131 affixed at the top to the housing of motor 124 and at the bottom to the housing of an oscillatory torque generator 132, shaft 130 driving the moving parts of the generator. An illustrative example of a suitable oscillatory torque generator will be described in detail in connection with the following embodiment of FIG. 11. Suffice it for the present to say that the housing of generator 132, when the generator is driven by the continuously rotating shaft 130, has an oscillatory motion in a rotary direction, turning through a substantial number of degrees of rotation in first one direction and the other, and thereby exerting an oscillating torque both on the torque tube 131, and on a somewhat massive, elastic, torsionally oscillatory torque shaft 133 extending downwardly from the generator housing. Large sections of both torque tube 131 and torque shaft 133 have been broken away in the drawings, and it is to be understood these members are of substantial length, and also that the shaft 133 is approximately twice the length of tube 131. More will be said in this connection hereinafter.

To the lower end of torque shaft 133 is coupled a small diameter core tube 136. The lower end of tube 136 is thin edged, and may illustratively be substantially of sine wave configuration, as indicated at 138 (FIG. 10), in order to facilitate working of the tube into the earthen material. Also, the inside of core tube 136 may be formed with a series of upwardly facing shoulders such as 139, designed to prevent the earthen core 140 from falling out of the core tube during elevation of the apparatus out of the well bore. It is important to recognize that this invention does not require chip making or drill bit action.

In the embodiment of FIG. 9, the core tube 136 is formed with a lateral bend at 142, and normally frictionally engages against the inside of housing 125. The lower portion of the tube 136 is thus disposed at a substantial angle to vertical, and its lower extremity initially engages against the opposite wall of housing 135, as at 143. At the upper end of the apparatus, the housing of motor 124 engages against the same side of housing 125 as does the lower end of the core tube. The apparatus is thus initially supported within housing 135 by frictional engagement therewith at the three described points. When the apparatus has been lowered in the well bore to approximately the depth at which a core is to be taken, it is suddenly dropped or jarred, or the oscillator is operated, whereupon the motor 124 and generator 132 slide downwardly in housing 125, core tube 136 emerges from the lower end of the housing, as indicated in dot-dash lines, so as to engage the sidewall of the well bore, and motor 124 is caught by a transverse shoulder 145 provided in the housing. The cable 123 leading to motor 124 is initially provided with sufficient slack to accommodate this drop. The suspension cable 122 is lowered sufficiently to assure pressural engagement of the sample tube against the sidewall of the bore hole.

Electric power is then furnished to motor 124, causing it to rotate and to drive the shaft 131, and in turn the torsional vibration generator 132. As heretofore mentioned, the housing of generator 132 oscillates rotationally on its vertical axis in response to continuous uni-directional rotation of drive shaft 130, and thus exerts an oscillating torque on the tube 131 as well as shaft 133 and the extension core tube 136. It was mentioned earlier that tube 131 is approximately half the length of shaft 133. Assuming that the tube 131 and shaft 133 are each substantially uniform in cross-section throughout their lengths, and that the lumped mass effect of generator 131 is relatively small, at an oscillation frequency of 200 c.p.s., the wavelength of an elastic torsion wave propagating along these members 131 and 133 as a result of the oscillatory torque applied thereto, becomes nearly 50 feet. In order to effectively isolate motor 124 from the torsional vibration in tube 131, and tube 131 is made effectively one quarter-wavelength in length (or it could be an odd multiple thereof). Taking into account certain lumped mass effects contributed by the generator, the length of tubing 131 should be a little less than one-quarter of 50 feet, and will be something under 13 feet. An effective quarter-wavelength standing wave, in a torsional mode, will accordingly be established in tubing 131, with a nodal point at the juncture of tubing 131 with the motor case, and an antinode at the juncture of tubing 131 with the case of generator 132.

The shaft 133, together with core tube 136, on the other hand, are to perform as a resonant half-wavelength device, vibrating with a half-wavelength torsional standing wave, with a velocity antinode at the lower end, particularly at the extremity of core tube 136, a velocity node at the midpoint, and a velocity antinode at the juncture of shaft 133 with the housing of generator 132. Equivalently, the shaft 133 may have a length equal to any multiple of half-wavelengths. This torsionally vibratory resonant shaft 133 functions in the vibratory system to provide stability, energy storage, or "flywheel" effect, and high "Q," and is analogous to the oscillatory energy storage device 50 of the embodiment of FIGS. 4–8. This desired half-wavelength standing wave is attained if the member 133, together with the tube 136 are effectively one half-wavelength for the operating frequency of the generator 132. In view of lumped mass effect contributed by generator 132, together with the reduction in cross-section throughout the core tube 136, the actual length of the member 133 together with core tube 136 will be satisfactory if of the order of 20 feet.

The lower extremity of core tube 136 is accordingly torsionally oscillated in first one direction and then the other. It will be appreciated that in this action, the member 133 taken together wtih core tube 136 operates with the two half-length portions thereof torsionally elastically deformed always in opposite directions with respect to one another, the amplitude of torsional deflection increasing progressively from the midpoint towards each end. The extremity of core tube 143, oscillating rotationally at 200 c.p.s., thus engages the sidewall of the bore hole. The core is fluidized, separated from the surrounding earth material, and "extruded" or received into the tube 136 in the same general manner more fully described in connection with earlier embodiments of the invention, it being understood that the tube 136 penetrates the sidewall under the combined influence of the bias pressure exerted on the tube, which effects a good sonic coupling to the sidewall material, and the sonic oscillation of the tube. As stated, the material in the region of the end of the sonically energized tube is fluidized, and a sample core separated from the earth and received, in an extrusion like process, inside the advancing tube. FIG. 10A shows the end of a modified core tube 136a equipped with an auxiliary tubular tip 146, with an outside, inwardly converging bevel at its lower end to form a thin or knife-edge, and formed with a socket which receives the lower end of tube 136a with a fairly tight but slidable fit. This tip presents an upwardly facing shoulder at 147. This tip 146 is designed to remain in the sample hole after the sample has been taken within the tube 136a, the shoulder 147 resisting removal by engagement with the formation, and the tube 136a pulling out of the socket of the tip when the equipment is elevated. When the tube 136a leaves the tip 146 and then moves upwardly and laterally within its bore hole, the sample core therewithin breaks off at the break between the tip 146 and the end of the tube.

FIG. 10B shows a modified tip formation 148 on the end of modified tube 136b, characterized by a lower end portion of 148 of increased wall thickness, and an inside bevel 149 leading to a thin or knife edge at the bottom.

In FIGS. 11 to 14 I have shown a modified form of apparatus for extruding a sidewall core into a core tube. An electric motor 150, understood to have a vertical drive shaft, is hung by means of suspension cable 151, the latter being understood to include electrical conductor through which motor 150 is furnished with electrical power. Extending downwardly from the housing of motor 150 is a torque tube 152, to which the upper end cap 153 of the housing 154 of a torsional vibration generator 155 is fixed. This generator is similar to that of FIG. 9, and this description can be considered applicable to FIG. 9. Drive shaft 156 within torque tube 152 is driven from motor 150, and has on its lower end, within generator housing cap 153, a spur gear 156a, which meshes with two spur gears 157, one on each side thereof, also housed within cap 153. Journalled in housing 155 on vertical axes through these gears 157, and joined thereto, so as to be driven in the same direction thereby, are two unbalanced rotors 158. As will be seen, these rotors 158, formed with masses displaced to one side of their axes of rotation, approach and recede from one another in unison. Forces in the direction of a line intersecting the axes of the two rotors are accordingly balanced out. On the other hand, alternating force components exerted by the two unbalanced rotors along direction lines at right angles to the line intersecting the rotor axes are opposed, but exerted on opposite sides of the generator axis, and therefore coact to create an alternating couple. Thus an alternating torque is exerted on the generator housing, and in turn exerted by the generator housing on torque tube 152.

An elastic torque shaft 160 is secured to and extends downwardly from generator case 155, and an alternating torque wave is similarly exerted on the upper end of this shaft 160.

At the lower end of torque shaft 160 is a universal joint mounting for a slender core tube 161 adapted to assume a slant position so as to take a core from the sidewall of the bore hole as in FIG. 10. Tube 152 and shaft 160 are effectively a quarter-wavelength (or odd multiple thereof) and a half-wavelength (or multiple thereof), respectively, in overall length for the resonant operating frequency of generator 155.

In the particular design here shown, shaft 160 has an enlargement 160a at its lower extremity, and fitted thereover is a depending sleeve 162 within which is secured, as by welding, a downwardly convergent fitting 163 in whose lower end is fitted a pair of trunnions 165 projecting horizontally from a universal joint body 166. Trunnions 167 projecting horizontally from universal joint body 166 at right angles to trunnions 164 pivotally support a mounting body 170 fitted to the upper end of core tube 161. The tube 161 will thus be seen to be universal-joint-mounted on the lower end of shaft 160. A spring 171 connected between an ear on one side of body 170 and a suitable anchorage within sleeve 162 biases the tube 161 to the slant core-taking position shown in full lines in the drawing. The tube 161 is held in a vertical or centered position during running of the apparatus into the bore hole by lodging a frangible pellet 173 between a somewhat flattened upper extension 174 of mounting body 170 and one of the arms 164 as indicated in dash lines. When the apparatus is started, the vibration immediately crushes this pellet, and permits spring 171 to position the core tube in the desired slant position.

Operation of the apparatus of FIGS. 11–13 is in general similar to that of FIG. 10, the alternating torque generator 155 being driven by motor 150 at a resonant frequency of torque tube 152 and shaft 160, at which a quarter-wavelength standing wave is established in tube 152, isolating the motor from vibration, and wherein a half-wavelength standing wave is established in torque shaft 160, establishing an antinode at the lower end thereof, and therefore maximized torsional oscillation at that point. The universal joint mounting for core tube 161 permits this maximized torsional oscillation to be transmitted to the core tube, which thus, when pressed against the wall of the earth bore, takes a core in a manner similar to that described in connection with earlier embodiments of the invention.

The embodiment of FIG. 15 involves running of the core-taking equipment through the drilling apparatus used to make the main bore 179. The core-taking apparatus in this instance is of the torsional vibration type, generally resembling that of FIG. 11, and in the example shown, the core is taken from the bottom of the main bore, though it will be evident that by elevating the main drilling apparatus somewhat above the bottom of the bore, the core-taking tube may alternately take a core from the sidewall.

In FIG. 15, numeral 180 designates generally the drill collar of a more or less conventional rotary earth boring drilling apparatus, collar 180 being furnished with a bit 181 of the type carrying a plurality, generally three, of conventional roller cone cutters 182. Bit 181 is modified slightly from conventional practice by providing it with an interior cavity 183 formed with outwardly-angled passages 184 adapted to guide the core tube 135 into the outwardly-angled operating position as shown in FIG. 15.

Collar 180 has the usual interior bore 186, and when it is desired to take a core, the core-taking apparatus 187 of the present invention is lowered through the drill pipe above, not shown, and down through bore 186 in collar 180. This core-taking apparatus has, as in the case of the embodiment of FIG. 11, an electric drive motor 190 hung by means of suspension cable 191, extending downwardly through the drill pipe and collar 180, cable 191 being understood to include an inner electrical conductor through which motor 190 is supplied with electrical power. Extending downwardly from the housing of motor 190 is torque tube 192, to which the upper end cap 193 of the housing of a torsional vibration generator 194 is fixed. The generator 194 may be similar to generator 155 of the embodiment of FIG. 11. A drive shaft 195 within torque tube 192 is driven from the vertical shaft of motor 190, and drives torsional vibration generator 194 as in FIG. 11.

An elastic torque shaft 198 is secured to and extends downwardly from the housing of generator 194, and its lower end is connected, by means of a universal-joint at 199, to the upper end of the aforementioned core tube 185. The lower end portion of shaft 198 may be provided with guide ribs 200 for purpose of spacing the apparatus centrally within collar bore 186. A somewhat deformed or cocked coil spring 201 acting between a shoulder 202 on the lower end of shaft 198 and a flange 203 on the upper end portion of core tube 185 biases the universal-joint-mounted core tube 185 to take normally a slant or angular position with references to the axis of shaft 198. The bias action may be restrained, if desired, during run-in, by use of a frangible pellet member as above-described. Momentary operation of the oscillator will eliminate this frangible member, if desired, shortly before reaching the bit. Accordingly, when the core-taking apparatus is lowered in the drilling apparatus, the core tube 185 is enabled to find one of the guide passages 184 in the bit, and to pass therethrough and project outwardly from the lower end of the bit into position to engage either the bottom end of the earth bore, as shown in FIG. 15, or alternatively the sidewall of the bore in the event that the drilling apparatus is supported somewhat higher up from the bottom of the earth bore.

The relative dimensions of torque tube 192 and torque shaft 198 are as described in connection with the embodiments of FIGS. 9 and 11, and the operation is similar in all respects. The embodiment of FIG. 15 differs from the earlier-described embodiment in the essential respect only that it is adapted for use within the main earth bore drill, so that the latter need not be removed from the well bore to permit use of the core-taking apparatus.

The invention has now been illustrated and described in two applications, and in a number of illustrative embodiments; it will be understood, however, that these are for example only, and that the invention is broadly applicable in other environments, as well as capable of embodiment in various other specific forms of apparatus, without departing from the spirit and scope of the appended claims.

I claim:

1. A sonic device lowerable within an earth bore for taking an elastically vibratory sample of earth material, that comprises: a tube having an open end and having a length which is any number of half-wavelengths, including unity, of a resonant standing wave pattern in the tube for a predetermined vibratory frequency, a sonic wave generator acoustically coupled to said tube for sonically vibrating said tube at said frequency, an elastically oscillatory energy storage device acoustically coupled to said generator to be oscillated thereby and having such parameters of mass and elasticity as to be resonant at said vibration frequency, and means for lowering said acoustically coupled tube, generator and oscillatory energy storage device into the well bore and pressurably applying said thin-edged open end of said tube against the earth material adjacent to said bore.

2. The subject matter of claim 1, wherein said wave generator is of a type delivering a linear alternating force and is coupled to the upper end of said tube with such orientation that said such alternating force is applied to said tube longitudinally thereof, and wherein said oscillatory energy storage device is above said generator and comprises a pair of parallel vertical elastic legs rigidly interconnected to one another at the top and free of one another below the top, whereby to be capable of opposed elastic vibration, with one of said legs coupled to said generator at its lower end, the lengths of said legs being equivalently equal to substantially a quarter-wavelength of a longitudinal wave therein at the operating frequency of the generator.

3. The subject matter of claim 2, including a motor for driving said generator located above said parallel legged oscillatory energy storage device and having a housing rigidly connected to the interconnected upper ends of said legs, and a rotatable motor shaft extending downwardly through said parallel legged oscillatory energy storage device and operatively coupled at its lower end to said wave generator.

4. The method of taking a core of earthen material from the wall of a well bore that includes: holding a core tube against said wall with pressure so as to accomplish a sonic coupling thereto, transmitting a continuous pattern of longitudinal sonic vibrations along a path comprising an elastic column means of solid material to the point of contact of said core tube against said wall and continued by an annular portion of the wall material in immediate contact with said core tube, so that a core of earthen material is sonically severed from the naturally occurring position of its constituent material in said wall and introduced into said core tube, and simultaneously transmitting a continuous pattern of longitudinal sonic elastic vibrations to said core of material encompassed within said core tube as said core flows along inside of said core tube.

5. The method of facilitating the entry and flow of a core of fluidizable material from a body thereof into an elastically vibratory open-ended tube, that comprises: effecting an acoustic coupling between the open end of said tube and said body of material by applying said open end of said tube against said body of material with sufficient pressure that sonic vibrations of the tube produce longitudinal sonic wave action in the region of the immediately adjacent material physically contacted thereby, and sonically vibrating said tube with a continuous pattern of elastic vibrations while in such physical pressural contact with the material, whereby the sonic wave action in the material accomplishes sonic fluidization of said material in said region, so that the sonic vibration of the tube surface in contact with the material in combination with the pressure of the tube on the material induces a core of the material to enter into and slide freely along the tube.

6. The method of claim 5, wherein the tube is sonically vibrated at a frequency to establish a sonic standing wave in the tube.

7. The method of claim 6, wherein the tube is vibrated in a longitudinal mode.

8. The subject matter of claim 6, wherein the tube is vibrated in a torsional mode.

9. The method of taking a core of fluidizable earth material from within a bore in the earth, that comprises: lowering a tube having a thin-edged open lower end into said bore, effecting an acoustic coupling between said open end of said tube and a wall of said bore by applying said open end of said tube against said wall with sufficient pressure that sonic vibration of the tube produces sonic wave action in the immediately adjacent earth material of said wall physically contacted by said tube, and sonically vibrating said tube with a continuous pattern of longitudinal elastic vibrations while in such pressural contact with the wall of earth material, whereby the sonic wave action in the earth material accomplishes sonic fluidization of the earth material immediately adjacent the open end of the tube, so that the sonic vibration of the end and inner tube surfaces in contact with the material in combination with the pressure of the tube on the material induces a core of the earth material to be sonically severed from the wall and to enter into and slide freely along the tube.

10. A sonic device lowerable within an earth bore for taking a sample of earth material, that comprises: a tube having an open lower end, a sonic wave generator acoustically coupled to said tube for sonically vibrating said tube, an elastically vibratory vertical shaft acoustically intercoupled between said generator and tube and having such parameters of mass and elasticity as to have a resonant standing wave frequency in the range of the operating frequency of said sonic wave generator, means pivotally joining the upper end portion of said tube to said shaft to accommodate angular deflection of said tube whereby to engage the side wall of the earth bore, and means for lowering said acoustically coupled tube, generator and oscillatory energy storage device into the well bore and pressurably applying said thin-edged open end of said tube against the earth material adjacent to said bore.

11. The subject matter of claim 10, including means for constantly urging said tube to an angular position relative to the longitudinal axis of said shaft, whereby to engage the sidewall of the earth bore, and disengageable means controllable from the ground surface for temporarily holding said tube in a position axially of said shaft.

References Cited in the file of this patent

UNITED STATES PATENTS

| | | |
|---|---|---|
| 1,663,757 | Grainger | Mar. 27, 1928 |
| 1,882,906 | Renfer | Oct. 18, 1932 |
| 1,966,446 | Hayes | July 17, 1934 |
| 2,268,514 | Oberwetter | Dec. 30, 1941 |
| 2,345,739 | Fisher | Apr. 4, 1944 |
| 2,554,005 | Bodine | May 22, 1951 |
| 2,693,342 | Lynes | Nov. 2, 1954 |
| 2,697,585 | Chaney et al. | Dec. 21, 1954 |
| 2,707,617 | Brady | May 3, 1955 |
| 2,747,222 | Koch et al. | May 29, 1956 |
| 2,743,585 | Berthet et al. | May 1, 1956 |
| 2,748,298 | Calosi et al. | May 26, 1956 |
| 2,802,237 | Davis | Aug. 13, 1957 |
| 2,803,433 | Smith | Aug. 20, 1957 |
| 2,852,230 | Garrison | Sept. 16, 1958 |
| 3,049,185 | Herbold | Aug. 14, 1962 |

FOREIGN PATENTS

| | | |
|---|---|---|
| 602,801 | Great Britain | June 3, 1948 |
| 932,182 | Germany | Mar. 28, 1957 |

UNITED STATES PATENT OFFICE
CERTIFICATE OF CORRECTION

Patent No. 3,169,589                                                    February 16, 1965

Albert G. Bodine, Jr.

It is hereby certified that error appears in the above numbered patent requiring correction and that the said Letters Patent should read as corrected below.

Column 15, line 72, for "an elastically vibratory" read -- a --; line 73, for "a" read -- an elastically vibratory --.

Signed and sealed this 17th day of May 1966.

(SEAL)
Attest:

ERNEST W. SWIDER                                        EDWARD J. BRENNER
Attesting Officer                                                    Commissioner of Patents